Feb. 14, 1956

O. E. GALLAND 2,734,542

FRUIT PICKING BUCKET

Filed Oct. 6, 1954

INVENTOR

OPAL E. GALLAND

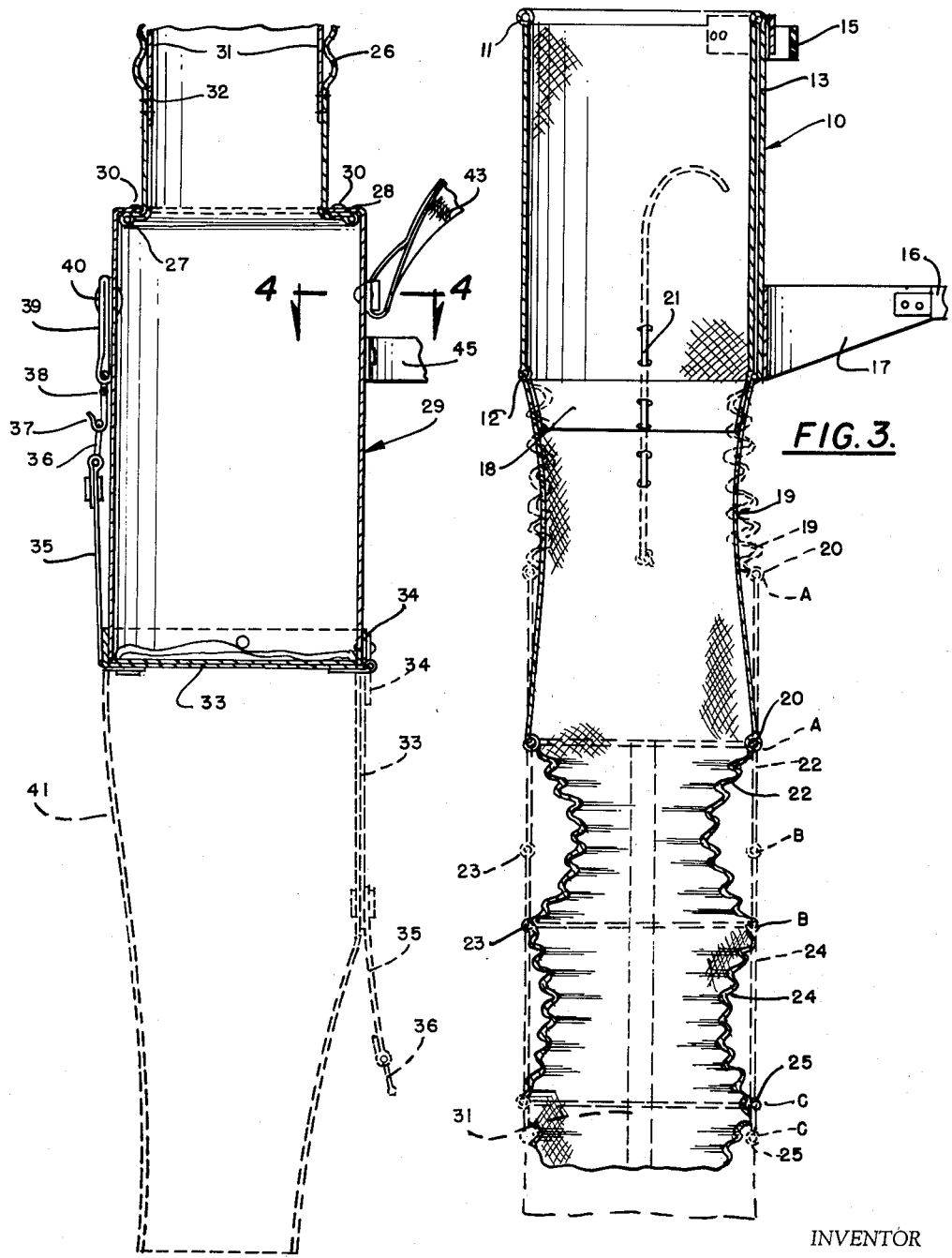

United States Patent Office 2,734,542
Patented Feb. 14, 1956

2,734,542

FRUIT PICKING BUCKET

Opal E. Galland, Wapato, Wash.

Application October 6, 1954, Serial No. 460,581

2 Claims. (Cl. 150—2)

This invention relates to fruit picking buckets.

It is an object of the present invention to provide a fruit picking bucket designed for small fruits that do not bruise easily wherein the fruit, as it is picked from the tree, is conveyed from the hand of the picker into the bucket.

It is another object of the present invention to provide a fruit picking bucket of the above type which will eliminate many movements on the part of the picker from the tree to the bucket, the fruit being conveyed from the hand of the picker to the bucket by a novel picking spout.

It is another object of the present invention to provide a fruit picking bucket of the above type wherein the bucket portion is enclosed to prevent the fruit from being mashed or spilled and wherein the bottom of the bucket is provided with a removable closure having a pouring spout attached thereto which will empty the fruit from the bucket without bruising the same.

It is still another object of the present invention to provide a fruit picking bucket of the above type wherein the picking spout is adjustable both to the arm dimensions of the picker and to the magnitude of the picking movements.

Other objects of the present invention are to provide a fruit picking bucket bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Fig. 2 is a vertical sectional view thereof taken along the line 2—2 of Fig. 1 and showing in phantom the pouring spout when in the operative position;

Fig. 3 is a longitudinal sectional view of the picking spout taken along the line 3—3 of Fig. 1

Figures 1, 4:
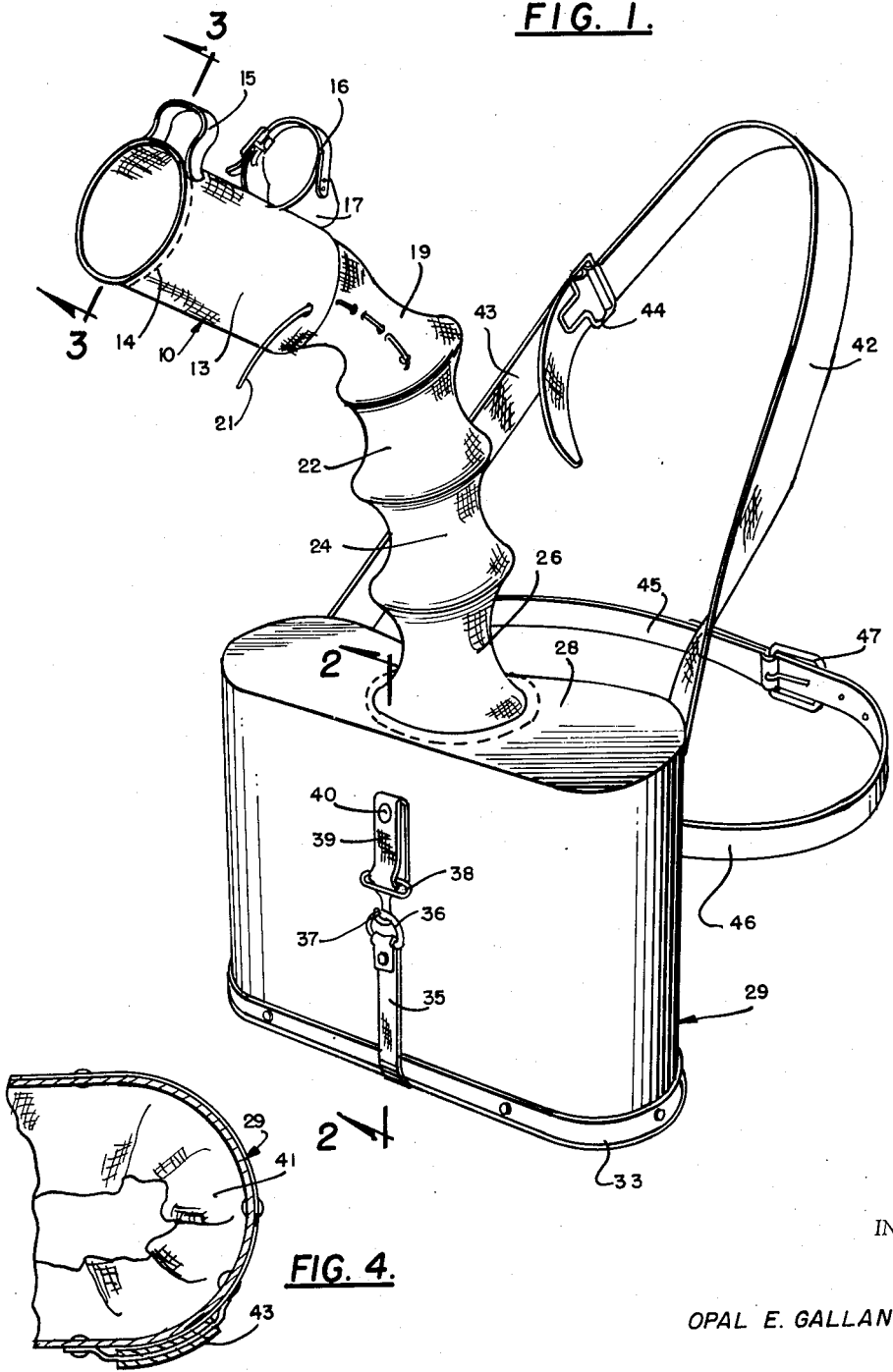
Figure 1 is a perspective view of a preferred embodiment of the invention.
Fig. 4 is a transverse sectional view taken along the line 4—4 of Fig. 2.

Referring now more in detail to the drawing, a picking spout indicated generally at 10 is provided and includes the wire rings 11 and 12 connected by the cylindrical fabric casing 13, it being noted that the casing 13 is of a double layer and secured about the rings 11 and 12 as by stitching 14 (Fig. 1). A wrist encircling elastic strap 15 is secured at opposite ends in suitable manner to the picking spout 10 near the forward open end thereof while the rear end of the picking spout is secured to the arm of the picker below the elbow by means of the strap and buckle assembly 16. The strap assembly 16 is secured to a strap 17 which is in turn secured in suitable manner across its central portion to the picking spout 10. Thus, the picking spout may be easily and readily mounted below the hand of the picker and as readily removed therefrom. The rear end of the casing 13 is formed with a frusto-conical open portion 18 (Fig. 3) which is suitably secured within one end of a fabric sleeve 19, the other open end of the sleeve 19 being mounted upon a ring 20. A draw string 21 passes through a plurality of longitudinally spaced openings provided in the sleeve 19 and extends outwardly through an opening in the sleeve 13, the rear end of the draw string 21 being knotted to limit its displacement through the sleeve 19, as will be obvious. By means of the draw string 21, the sleeve 19 may be lengthened or shortened to accommodate the device for different length arms.

The sleeve 19 continues away from the picking spout 10 in a fabric sleeve portion 22 which is connected at its other end to a second ring 23. A fabric sleeve 24 representing a continuation of the picking spout assembly is connected at one open end to the ring 23; at its other end, to a ring 25. The final section of the picking spout assembly is completed by fabric sleeve 26 connected at one open end to the ring 25, and at its other end to a ring 27 (Fig. 2) mounted within a circular opening provided in the top wall 28 of a bucket indicated generally at 29 by means of the rivets 30.

A pair of continuous oppositely disposed elastic strips 31 are secured to the insides of the sleeves 19, 22, 24 and 26 by means of stitching 32 and serve to retain the latter in the contracted disposition of Figs. 1 and 3 which automatically shortens the spout assembly when picking at relatively short distances, while at the same time permitting their expansion for greater distances. It will be noted that the rings 11, 12, 20, 23, 25 and 27 will serve to retain the picking spout open at all times and the wire 11 will spring down, if bumped accidentally against a limb or the like, and will spring back into place when the pressure thereon is released.

As shown in Fig. 2, the bucket 29 includes a lid or bottom closure 33 hingeably connected to the bucket by the hinge 34, the lid 33 being normally retained in a closed position by means of a strap 35 suitably connected thereto. As shown in Figs. 1 and 2, the strap 35 terminates in a ring 36 which engages a hook 37 formed in a flat ring 38 supported by a clamp 39, the clamp 39 being secured to the front of the bucket 29 by means of a rivet 40. In order to empty the bucket 29, it is only necessary to remove the ring 36 from hook 37, to permit the lid 33 to be lowered to the open position shown in phantom in Fig. 2. A fabric pouring spout 41 is suitably secured to the bottom of the bucket and to the inside of the lid 33. The pouring spout 41 will empty the fruit without bruising the same.

Shoulder straps 42 and 43 suitably secured to opposite sides of the bucket 29 are adjustably connected by means of the wire buckle 44, the straps going over the shoulder of the picker.

Straps 45 and 46 adjustably connected by means of the buckle 47 are secured at their free ends in suitable manner to the opposite sides of the bucket 29, the straps 45 and 46 extending around the waist of the wearer. The straps 45, 46 with hold the bucket 29 in the proper position.

It will be noted that the hand of the picker slides through the elastic 15 on the picking spout 10 which permits free movement of the hand to reach for fruit in any direction.

While various changes may be made in the detail construction, it shall be understood that such changes shall be within the spirit and scope of the present invention as defined by the appended claims.

What I claim as new and desire to protect by Letters Patent of the United States is:

1. In a device of the class described, a picking spout comprising a hollow member open at both ends, means for securing said picking spout to the arm of an operator so that the upper end thereof is in position to receive articles released from the fingers and hand, a flexible conduit member in open communication with the lower end of said picking spout and secured thereto, a receptacle in open communication with the lower end of said conduit member, and means for mounting said receptacle across the body, said conduit member being adjustable, said receptacle having a hinged bottom lid, means for retaining said lid in a closed position, and a flexible pouring spout secured to the open bottom of said receptacle and to said lid adapted to empty the contents of said receptacle without bruising the fruit, said conduit member comprising a plurality of longitudinally spaced rigid ring members connected by a flexible fabric covering, said means for adjusting the length of said conduit member comprising a draw string connected at one end to said fabric covering and extending through longitudinally spaced openings provided therein and outwardly through said picking spout.

2. In a device according to claim 1, including a plurality of oppositely disposed continuous longitudinal strips of elastic material secured to the inside of said fabric covering and extending within said ring members whereby to normally maintain said conduit member in retracted position.

References Cited in the file of this patent

UNITED STATES PATENTS

| Number | Name | Date |
| --- | --- | --- |
| 852,082 | Smith | Apr. 30, 1907 |
| 876,038 | Byran et al. | Jan. 7, 1908 |
| 1,143,512 | Cruson | June 15, 1915 |
| 1,170,960 | Canterbury | Feb. 8, 1916 |
| 1,188,955 | Leonard | June 27, 1916 |
| 1,404,163 | Pim | Jan. 17, 1922 |
| 1,470,334 | Stensgaard et al. | Oct. 9, 1923 |
| 2,437,461 | Faulkner | Mar. 9, 1948 |